(12) United States Patent
Park

(10) Patent No.: US 7,752,644 B2
(45) Date of Patent: Jul. 6, 2010

(54) METHOD AND APPARATUS OF PROVIDING AND RECEIVING VIDEO SERVICES IN DIGITAL AUDIO BROADCASTING (DAB) SYSTEM

(75) Inventor: Jeong-hoon Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1061 days.

(21) Appl. No.: 11/345,270

(22) Filed: Feb. 2, 2006

(65) Prior Publication Data

US 2006/0130115 A1    Jun. 15, 2006

Related U.S. Application Data

(63) Continuation of application No. 11/243,975, filed on Oct. 6, 2005.

(30) Foreign Application Priority Data

Oct. 6, 2004    (KR) .................... 10-2004-0079687
Oct. 21, 2004   (KR) .................... 10-2004-0084374

(51) Int. Cl.
    *G06F 3/00* (2006.01)
(52) U.S. Cl. .................. 725/54; 725/62; 725/118; 725/147; 725/148
(58) Field of Classification Search .............. 370/203, 370/208, 464, 480, 485, 486, 487; 725/105, 725/118, 114, 117, 143, 144, 147, 148
    See application file for complete search history.

(56) References Cited

U.S. PATENT DOCUMENTS

| 5,452,288 | A | 9/1995 | Rahuel et al. | |
| 6,202,178 | B1 | 3/2001 | Spruyt | |
| 7,069,398 | B2* | 6/2006 | Lin et al. | 711/157 |
| 2002/0057893 | A1* | 5/2002 | Wood et al. | 386/46 |
| 2005/0055714 | A1* | 3/2005 | Lee | 725/54 |

(Continued)

FOREIGN PATENT DOCUMENTS

CN    1578422 A    2/2005

(Continued)

OTHER PUBLICATIONS

ETSI TR 101 496-2 V1.1.2 (May 2001) Technical Report Digital Audio Broadcasting (DAB); Guidelines and rules for implementation and operation; Part 2: System features.*

(Continued)

*Primary Examiner*—Chi H Pham
*Assistant Examiner*—Weibin Huang
(74) *Attorney, Agent, or Firm*—Sughrue Mion, PLLC

(57) ABSTRACT

There are provided a method and apparatus for providing and receiving a video service in digital audio broadcasting (DAB). The video service providing method includes: storing information related to encoding of a provided video service stream and information related to packetization of the video service stream in a channel different from a service data channel; and multiplexing the information related to encoding of the video service stream and the information related to packetization of the video service stream to create a DAB transmission frame, and transmitting the DAB transmission frame. Therefore, by allowing different types of DAB receivers to uniformly process video services, it is possible to achieve high efficiency in video service processing and controlling.

33 Claims, 15 Drawing Sheets

U.S. PATENT DOCUMENTS

2006/0262227 A1* 11/2006 Jeong .................... 348/723

FOREIGN PATENT DOCUMENTS

| EP | 1 024 615 A1 | 8/2000 |
| EP | 1 024 617 A1 | 8/2000 |
| EP | 1 045 537 A2 | 10/2000 |
| EP | 1 432 158 A1 | 6/2004 |
| WO | WO 01/37573 A1 | 5/2001 |

OTHER PUBLICATIONS

ETSI TR 101 496-3 V1.1.2 (May 2001) Technical Report; Digital Audio Broadcasting (DAB); Guidelines and rules for implementation and operation; Part 3 Broadcast network.

ETSI TR 101 496-1 V1.1.1 (Nov. 2000) Technical Report; Digital Audio Broadcasting (DAB); Guidelines and rules for implementation and operation; Part 1: System outline.

European Search Report for EP 05 25 6165 of Dec. 16, 2005.

The State Intellectual Property Office of P.R. China, Office Action Issued Jan. 9, 2009 for corresponding Chinese application No. 200510108232.X.

* cited by examiner

FIG. 11B

| SERVICE ID | PROFILE INFORMATION | ON/ OFF | PACKETIZATION INFORMATION ..... |
|---|---|---|---|
| 16 BITS | 8 BITS | | |

FIG. 12

| | | VIDEO | | AUDIO | | |
|---|---|---|---|---|---|---|
| PROFILE ID | FLAG | PAYLOAD TYPE | PACKET CONFIGURATION INFORMATION | PAYLOAD TYPE | PACKET CONFIGURATION INFORMATION | ... |
| 1 BYTE | 1 BIT | 1 BYTE | 2 BYTES | | | |

METHOD AND APPARATUS OF PROVIDING AND RECEIVING VIDEO SERVICES IN DIGITAL AUDIO BROADCASTING (DAB) SYSTEM

This is a continuation of application Ser. No. 11/243,975 filed Oct. 6, 2005. The entire disclosure(s) of the prior application(s), application Ser. Nos. 11/243,975 is hereby incorporated by reference.

This application claims the priorities of Korean Patent Applications No. 10-2004-0079687, filed on Oct. 6, 2004, and No. 10-2004-0084374, filed on Oct. 21, 2004, in the Korean Intellectual Property Office, the disclosures of which are incorporated herein in their entireties by reference.

BACKGROUND OF THE INVENTION

1. Field of the Invention

The present invention relates to digital audio broadcasting (DAB), and more particularly, to a method and apparatus of providing and receiving video services in DAB.

2. Description of the Related Art

Analog audio broadcasting has drawbacks in that signal quality is remarkably deteriorated while a receiver is moving, power efficiency is poor due to high power used for removing noise, and spectrum efficiency is low since different frequencies are used in adjacent regions to avoid channel interference. To eliminate these drawbacks, studies into Digital Audio Broadcasting (DAB) that can substitute for existing analog radio broadcasting such as AM, FM radio broadcasting, are currently underway. A standard for such digital audio broadcasting is disclosed in 'ETSI EN 300 401' issued by ETSI (European Telecommunication Standardization Institute).

The standard 'ETSI EN 300 401' is also called 'EUREKA-147'. The 'EUREKA-147' describes providing of audio services and various additional services with CD-level quality using a superior audio compression technique based on MPEG-1 audio layer II at a band width of about 2 MHz. In order to transmit a large amount of audio data and general data at an optimal data rate using a limited band-width under a given channel environment, audio data are error-corrected by UEP (Unequal Error Protection) and general data are error-corrected by EEP (Equal Error Protection).

DAB is a type of multimedia broadcasting in which high-quality multi-channel audio is transmitted and various types of additional data are provided. The additional data includes still images, moving images, graphics, etc. Through DAB, it is possible to provide multimedia services, such as travel and traffic information services, a program linkage information service that provides a news image combined with headline characters or weather forecast and traffic information combined with electronic maps. Enhanced services such as web site broadcasting or a Global Positioning System (GPS) service, and a moving image service may also be provided with DAB.

Audio services, packet mode services, and stream mode data services among such services are provided based on a DAB standard (ETSI EN 300 401). However, video services using the stream mode data services are not defined in the DAB standard. Accordingly, in order to transmit or receive video data, the DAB standard should be corrected or complemented. For that, it is possible to make a standard of defining a transmission method of a broadcasting company and a receiving method of a receiver and provide a video service based on the standard. However, in this case, receivers which do not satisfy such a standard cannot receive the provided video service through a DAB stream mode.

Also, in the case where the video service is provided by a stream mode data service which is a main service channel, a provided video service stream generally includes encoding parameters regarding the video service and information for how the video data is packetized. Therefore, in order to stably receive the video data, the main service channel of DAB must be decoded so that the encoding parameters and the packetization method of the video data can be recognized.

SUMMARY OF THE INVENTION

The present invention provides a method and apparatus of providing and receiving video services through a stream mode in digital audio broadcasting (DAB).

According to an aspect of the present invention, there is provided a method for providing a video service in digital audio broadcasting (DAB), comprising: storing information related to encoding of a provided video service stream and information related to packetization of the video service stream in a channel different from a service data channel; and multiplexing the information related to encoding of the video service stream and the information related to packetization of the video service stream to create a DAB transmission frame, and transmitting the DAB transmission frame.

The video service stream includes encoded video data, encoded audio data, and/or encoded additional data, and further includes time synchronization information and multiplexing information of the encoded video data, the encoded audio data, and/or the encoded additional data.

The information related to packetization of the video service stream is information related to RTP (Real time Transport Protocol) packetization, UDP (User Datagram Protocol) packetization, IP packetization of encoded audio data, encoded video data, and/or encoded additional data. The method further comprises information related to the types of error-correction encoding and interleaving used.

The channel in which the information related to the encoding of the video service stream and the information related to the packetization of the video service stream are stored, is a Fast Information Channel (FIC) of the DAB transmission frame.

According to another aspect of the present invention, there is provided a method for receiving a video service in digital audio broadcasting (DAB), comprising: receiving a DAB transmission frame and parsing information related to a sub channel and a service component related to a service selected by a user; if the selected service is a video service, receiving and parsing packetization information and encoding information for processing the video service, through a channel different from a service data channel.

The packetization information and the encoding information are received through a Fast Information Channel (FIC) in the DAB transmission frame.

According to still another aspect of the present invention, there is provided an apparatus for processing a video service, comprising: a service information parser receiving a DAB transmission frame and parsing information regarding a sub channel and a service component related to a service selected by a user; a video service encoding parameter information parser, parsing information related to encoding of a video service stream and information related to packetization of the video service stream needed to process the selected video service, through a channel different from a service data channel; and a video service decoder driver driving a decoder for decoding the video service data.

BRIEF DESCRIPTION OF THE DRAWINGS

The above and other features and advantages of the present invention will become more apparent by describing in detail exemplary embodiments thereof with reference to the attached drawings in which:

FIG. 11B shows an exemplary FIG for a newly-defined video service encoding parameter;

FIG. 12 shows a structure of data including packetization information and encoding parameters, created by adding profile information and additional information;

DETAILED DESCRIPTION OF EXEMPLARY EMBODIMENTS OF THE INVENTION

Hereinafter, embodiments of the present invention will be described in detail with reference to the appended drawings.

Figure 1:
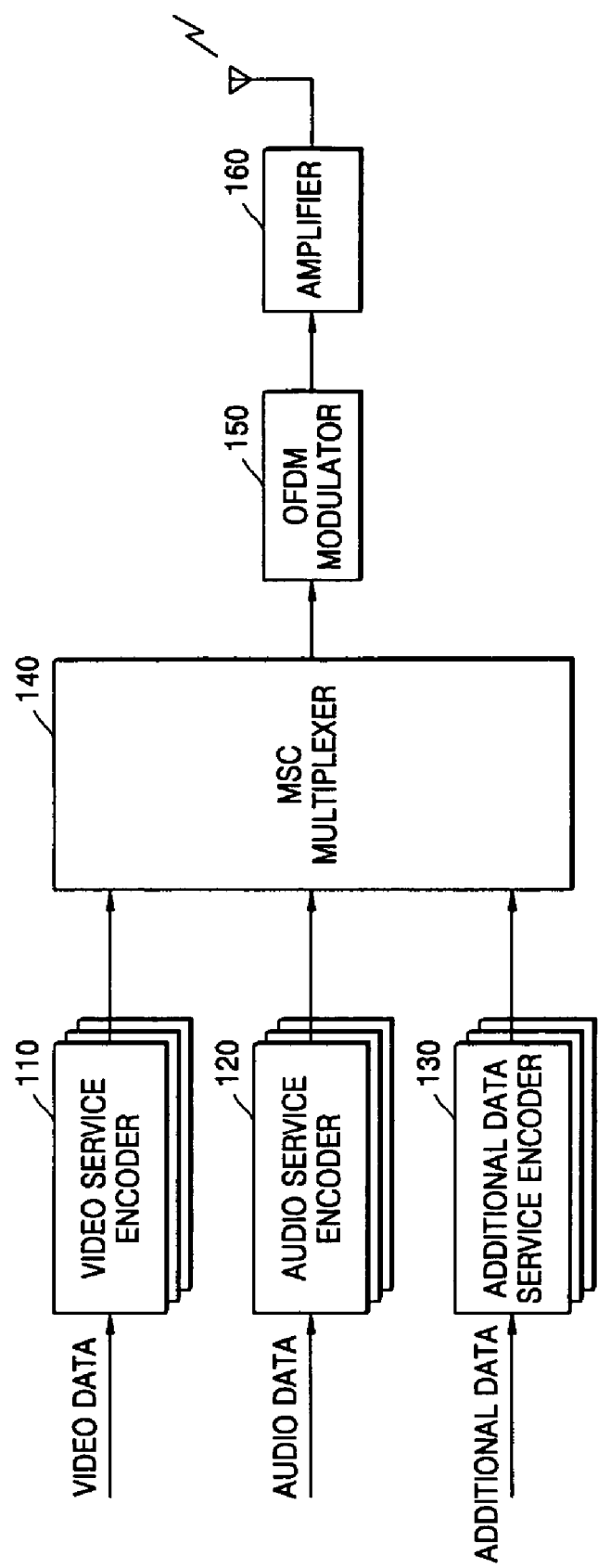
FIG. 1 is a block diagram of a receiving portion in a digital audio broadcasting (DAB) system for providing video services.

FIG. 1 is a block diagram of a receiving portion in a digital audio broadcasting (DAB) system for providing video services.

A DAB system, which provides video service data and additional service data as well as basic audio service data, includes a video service encoder 110, an audio service encoder 120, and an additional data service encoder 130. Audio service data, such as audio or music to be broadcasted, is input to the audio service encoder 120. The audio service data is encoded and channel-coded by the audio service encoder 120 and then output to an MSC (Main Service Channel) multiplexer 140. Since a DAB system can provide a plurality of audio services, a plurality of audio service encoders can exist.

Data, such as character information and web information, except for audio data, is classified into packet mode data. The packet mode data is input to the additional data service encoder 130. The packet mode data is encoded and channel-coded by the additional data service encoder 130 and then output to the MSC mulitiplexer 140. Likewise, since a DAB system can provide a plurality of packet mode data services, a plurality of additional data service encoders can exist.

To provide a video service in the DAB system, audio signals, image signals, and additional data signals are used. Image signals, such as movies, dramas, and moving images, additional data (for example, caption data) related to the image signals, or video service data including DAB-based packet mode data, such as character information, traffic information, still images, and web information, are classified into stream mode data. The stream mode data is input to the video service encoder 110. The stream mode data is encoded and channel-coded by the video service encoder 110 and then output to the MSC multiplexer 140.

The MSC multiplexer 140 multiplexes received audio services, packet mode data services, and stream mode data services, adds additional information and multiplexing information corresponding to the respective services to the multiplexed result, and then attaches synchronization information to the added result, thereby creating a DAB transmission frame. The DAB transmission frame is transferred to an OFDM modulator 150 and an amplifier 160 and then transmitted through a VHS band. A receiver for receiving the DAB transmission frame may be a fixed-type, portable, or mobile receiver.

Figure 2:
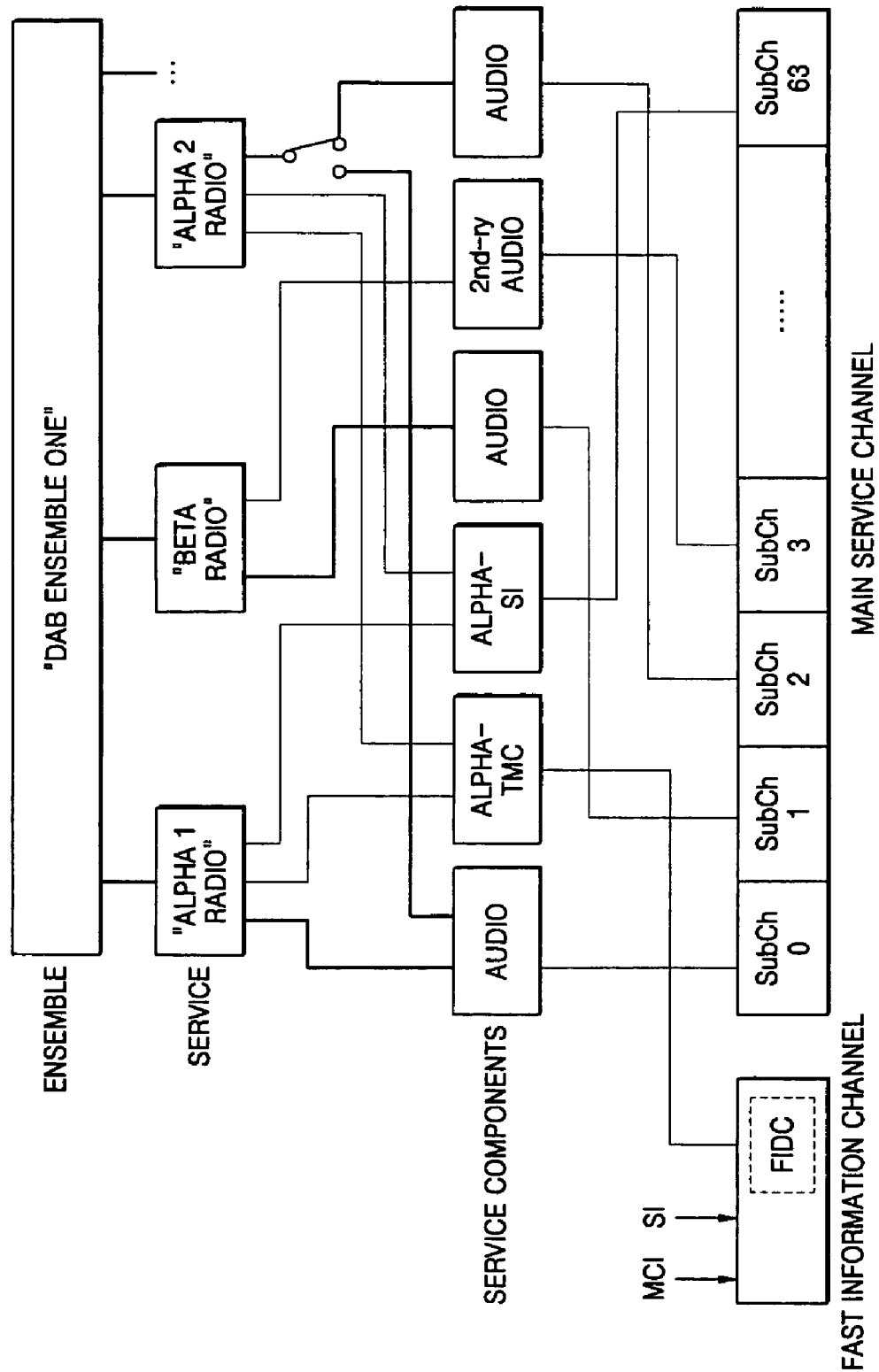
FIG. 2 shows an exemplary structure of sub-channels and service components configuring a DAB Ensemble.

FIG. 2 shows an exemplary structure of sub-channels and service components configuring a DAB Ensemble. 'Ensemble' means a bit stream obtained by channel-coding several encoded audio streams and several data streams and then multiplexing the channel-coded streams with system data. 'Service' means an output, such as a program service or a data service, selected by a user, and 'Service Components' means elements constituting a service. Service components of a given service are linked to each another through Multiplex Configuration Information (MCI). The service components are transmitted through Sub-Channel SubCh or Fast Information Data Channel (FIDC).

Referring to FIG. 2, "DAB ENSEMBLE ONE" includes three services; "ALPHA1 RADIO", "BETA RADIO", and "ALPHA2 RADIO". Each service includes corresponding service components. In FIG. 2, the service "ALPHA1 RADIO" includes service components of "Audio", "ALPHA-TMC", and "ALPHA-SI". The service components are respectively transmitted through corresponding sub channels. If the service "ALPHA1 RADIO" is a sports service, audio that broadcasts the service "ALPHA1 RADIO" is linked to the component "Audio", text information related to the service "ALPHA1 RADIO" is linked to the component "ALPHA-TMC", and information constituting the service "ALPHA1 RADIO" is linked to the component "ALPHA-SI". Here, "TMC" represents a traffic message channel through which traffic information is provided in real time.

A structure of the services and service components can be obtained from the MCI. That is, the MCI contains the service components of the services and allows the DAB receiver to analyze the service components. For example, if a user receives the service component "ALPHA-TMC", the DAB receiver analyzes the MCI, recognizes a fact that the service component "ALPHA-TMC" is transmitted through an FIDC, and reads related information from the FIDC of a FIC, to thereby provide a corresponding service to the user. The FIDC is used to transmit a small size of data that must be quickly transmitted within a predetermined time.

Sub channels through which transmit service components can be arbitrarily constructed by a service provider. Also, it is possible to reconstruct sub channels in correspondence to the changes in channel capacity or in service type. If sub channel component information or a service changes, newly-defined MCI is in advance transmitted so that the DAB receiver can receive the changed service.

Figure 3:
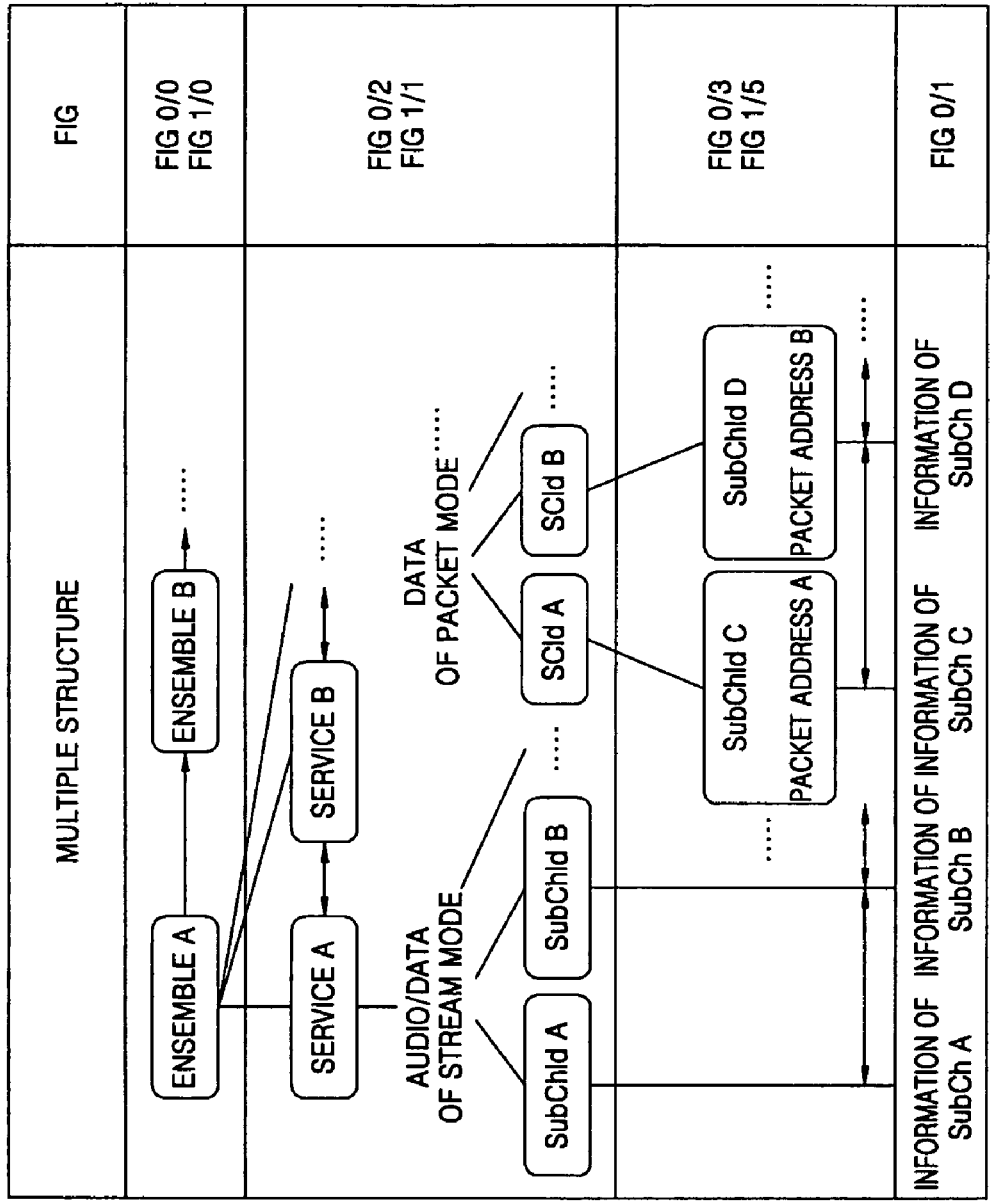
FIG. 3 shows a Fast Information Group (FIG) structure that contains information regarding selection of multiplexed contents, and information regarding ensembles, services, and service components.

FIG. 3 shows the structure of Fast Information Group (FIG) that contains information regarding selection of multiplexed contents, and configuration information regarding Ensembles, services, and service components.

A FIG is a bundle of data used by an application in a FIC. Referring to FIG. 3, a service includes several service components and several applications are transmitted through a sub channel corresponding to a sub channel ID or a service component ID. DAB describes the structure of a service using a FIC. Accordingly, if a service is selected by a user, information regarding a destination channel of the selected service and the channel size, i.e., sub channel information, is obtained from the MCI carried over the FIC, and the selected service is provided to the user or displayed on a screen. A FIG constitutes Fast Information Blocks (FIBs) that are carried over a FIC regarding a service, and thus, analysis of the FIG structure provides information regarding the service.

Figure 4:
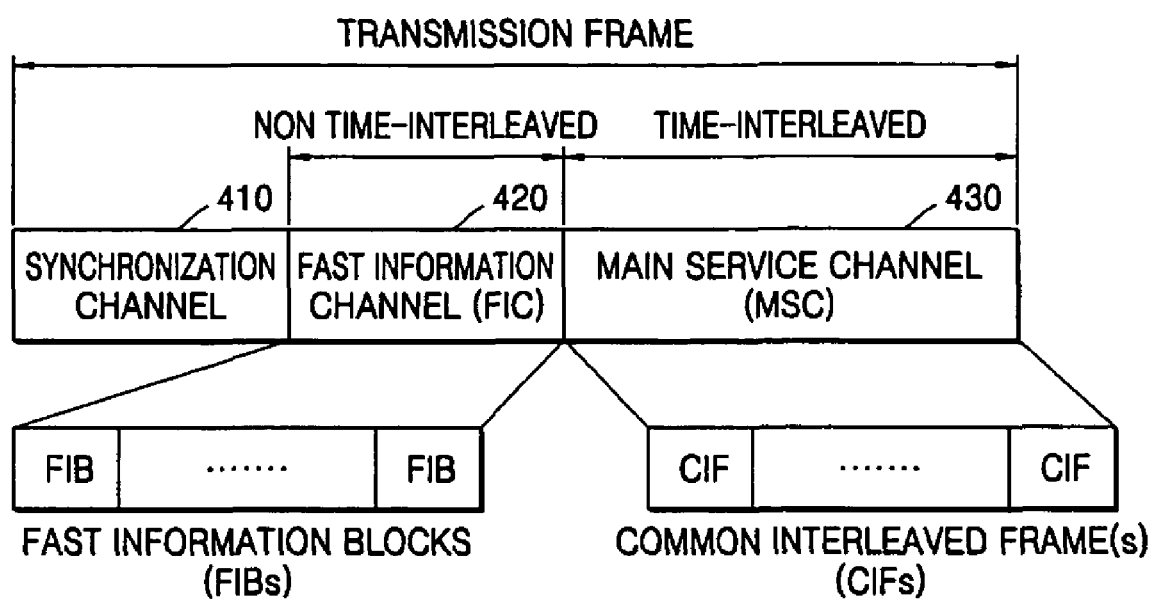
FIG. 4 shows a structure of a DAB transmission frame.

FIG. 4 shows the structure of a DAB transmission frame. The DAB transmission frame includes a synchronization channel (SC) 410, a FIC 420, and a main service channel (MSC) 430.

The SC 410 includes a null symbol that allows selection of a transmission mode, and a reference symbol required for Orthogonal Frequency Division Multiplexing (OFDM) symbol synchronization and carrier frequency synchronization. The FIC 420 is used to transmit information required by the DAB receiver and to process data, e.g., information regarding service structure or the structure of multiplexed service data, or data that must be quickly transmitted. The FIC 420 contains MCI specifying the structures of sub channels, and service information (SI) that is additional information regarding services. Accordingly, the type of channel reveals the type of service data transmitted via the MSC 430 and the type of application that will use the service. The FIC 420 may further contain data that must be quickly transmitted within a predetermined time. For instance, short emergency messages can be transmitted via the FIC 420. FIG structures constituting the FIC 420 will be described later with reference to FIG. 8.

Substantial content data provided by a service provider is transmitted through the MSC 430. If the FIC 420 is not spacious, FIC data can be partially included in the MSC 430. However, since time interleaving is applied to the MSC 430, time delay occurs during decoding of data. For this reason, FIC data that needs to be quickly transmitted is preferably not included in the MSC 430. Data can be transmitted in a stream mode or in a packet mode. In the stream mode, data is transmitted at a fixed bit rate without an additional header in a given sub channel. In the packet mode, data is transmitted together with a header, and thus, several service components can be multiplexed in a given sub channel. Accordingly, analysis of a header of a packet is further required in the packet mode to extract the data from a combination of the data and the header.

Figure 5:
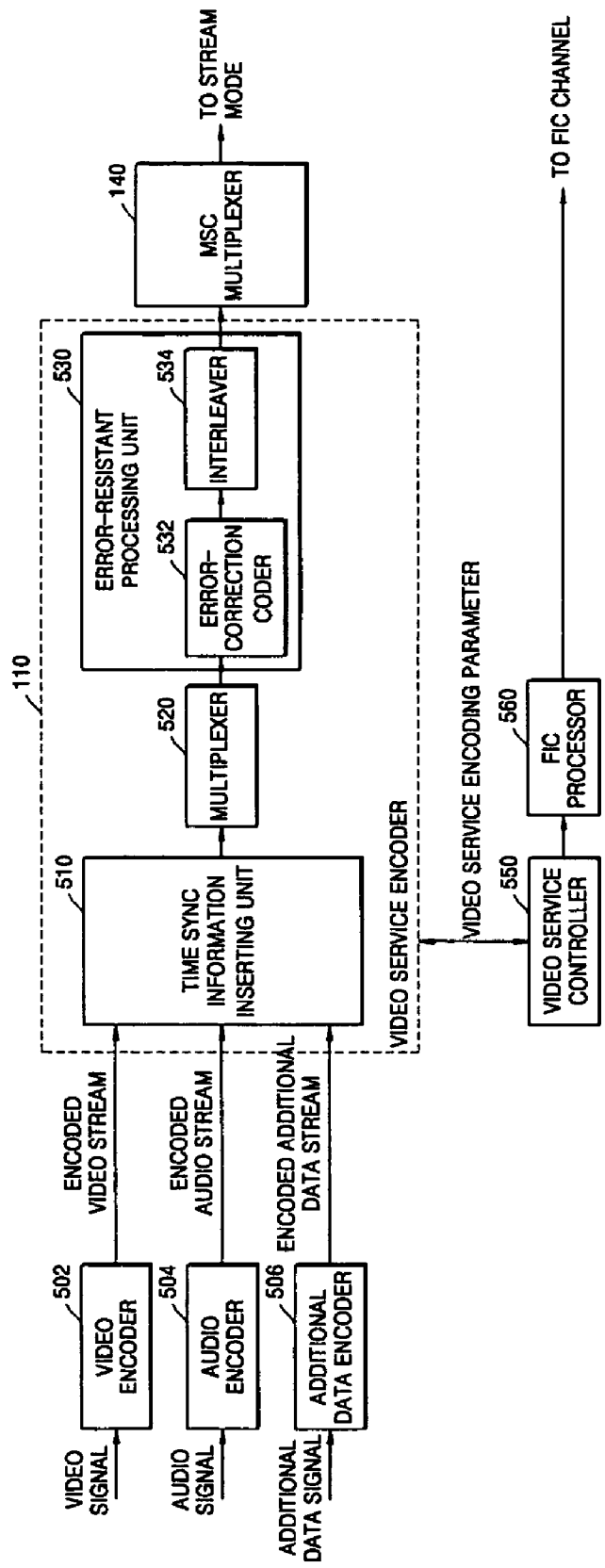
FIG. 5 is a block diagram of a video service encoder for providing video services.

FIG. 5 is a block diagram of a video service encoder for providing a video service.

Referring to FIG. 5, a video signal is encoded by a video encoder 502, an audio signal is encoded by an audio encoder 504, and additional data is encoded by an additional data encoder 506.

Packet mode data, such as character information, traffic information, still images, web information, that is transmitted in the packet mode of DAB, can also be used as additional data. These additional data are used with a packetized format based on a corresponding standard. In the case that the packet mode data is transmitted as additional data of a video service, error correction is performed by an error-resistant processing unit included in the video service encoder to reduce channel errors. By the error correction, transmission errors can be reduced compared with the transmission in the packet mode.

The video encoder 502 stores information regarding how a received video signal is encoded. For example, if a received video signal has been encoded based on MPEG-4 video coding, the video encoder 502 writes the size of the corresponding image, MPEG-4 profile information, and level information to the header of an encoded video stream. Then, the video encoder 502 parameterizes and outputs information regarding such video encoding. Likewise, the audio encoder 504 also stores information regarding how a received audio signal is encoded. For example, if a received audio signal has been encoded based on MPEG-4 audio coding, the audio encoder 504 writes a sampling rate, the number of channels, etc. of the received audio signal to the header of an encoded audio stream. Then, the audio encoder 504 parameterizes and outputs information regarding such audio encoding.

The additional data encoder 506 receives packet mode data, such as character information, traffic information, still image, and web information, which is additional data, or encoded general additional data, and parameterizes and outputs information regarding the type of the received additional data.

The video service encoder 110 receives the encoded video stream, the encoded audio stream, and the encoded additional data stream and creates and outputs a video service stream. An MSC multiplexer 140 receives the video service stream, multiplexes the video service stream with different service data, and then transmits the multiplexed result in a stream mode. The video service encoder 110 includes a time synchronization information inserting unit 510, a multiplexer 520, and an error-resistant processing unit 530.

The time synchronization information inserting unit 510 inserts time synchronization information into the received streams, so that audio data in the encoded audio stream, image data in the encoded video stream, and additional data in the additional data stream can be reproduced in synchronization with each other. That is, since the video encoder 502, the audio encoder 504, and the additional data encoder 506 independently encode received data, data encoded by each of the encoders 502, 504, and 506 includes no information regarding different data that must be simultaneously output. For this reason, the time synchronization information needs to be inserted in the respective received streams. According to an MPEG-4 SL-based method, an MPEG-4 SL-header including time synchronization information is added to an encoded video stream, an encoded audio stream, and an encoded additional data stream, respectively. The time synchronization information is parameterized and output.

The multiplexer 520 multiplexes the encoded audio stream, the encoded video stream, and the encoded additional data stream each including the time synchronization information, thus creating a transmission stream. For example, according to MPEG-2 TS, the multiplexer 520 creates 188 bytes of an MPEG-2 TS packet and performs multiplexing of the encoded streams using the MPEG-2 TS packet. The transmission stream includes PID which is a program ID of data contained in the MPEG-2 TS packet. Multiplexing information with the PID is also parameterized and output.

The multiplexed transmission stream is input to the error-resistant processing unit 530 to cope with transmission errors. The error-resistant processing unit 530 includes an error-correction coder 532 and an interleaver 534.

The error-correction coder 532 adds error correction data to the end of payload data to be transmitted, and the interleaver 534 re-arranges the bytes of the transmission stream with the error correction data using convolution interleaving, etc. For example, if the multiplexed stream is based on MPEG-2 TS, as described above, the MPEG-2 TS-packet has a size of 188 bytes and the error correction data is added to the end of the 188 bytes. The error correction coder 532 can create the error correction data using Reed-Solomon coding, etc. The interleaver 534 can use convolution interleaving, etc. Information regarding the error correction coding and interleaving are also parameterized and output.

The resultant error-resistant stream processed by the error-resistant processing unit 530 is transmitted by the MSC multiplexer 140 through a main service channel of the DAB.

The parameterized information (hereinafter, referred to as 'video service encoding parameter') is input to the video service controller 550. The video service controller 550 sends the video service encoding parameter to a FIC processor 560. The FIC processor 560 codes the video service encoding parameter and transmits the coded parameter through a FIC channel. Encoding information of video signals and audio signals among received encoding parameters is profiled and written to the FIC. Information regarding the error correction coding and interleaving used by the error-resistant processing unit 530 are written to a DSCTy (Data Service Component Type) field of FIG 0/2, and information regarding the inserting of the time synchronization information and the multiplexing are written to a user application field of FIG 0/13 and then transmitted through the FIC. A method of writing the encoding parameters will be described later.

The video service encoding parameter, which is information regarding a video service to be processed by the receiver, is used to initialize or select a corresponding decoder, a corresponding inverse multiplexer, etc. In other words, it is needed to in advance interpret whether stream mode data carried over the main service channel is a video service, to recognize how audio streams, video streams, and additional data streams configuring the video service are respectively encoded, and to recognize the type of error-resistant processing used.

In summary, the video service encoding parameter includes information required for initializing a video decoder of the receiver, as well as information regarding encoding, synchronization, and packetization of video streams configuring a video service. Also, the video service encoding parameter includes information required for initializing an audio decoder of the receiver, as well as information regarding encoding, synchronization, and packetization of audio streams configuring the video service. In a stream mode used for providing video services, since the start and end locations of data are not designated, it is necessary to detect the start location of successively input packet data. In MPEG-2 TS, a sync pattern '0x47' is regarded as the start location of data. However, in different standards, a predetermined pattern is in advance set as a sync pattern and it is determined that data starts when the predetermined pattern is detected. A packet number of the corresponding packet, information indicating whether the packet is a final packet, etc. can be added following the sync pattern so that the end location of the data can be recognized. Also, information needed for inverse-mulitiplexing the multiplexed stream, such as PID, PAT (Program Association Table), and PMT (Program Map Table), is included in the video service encoding parameter.

In FIG. 5, creating and transmitting of MPEG-2 TS-based video service data have been described. Now, IP-packetized video service data will be described with reference to FIG. 6.

Figure 6:
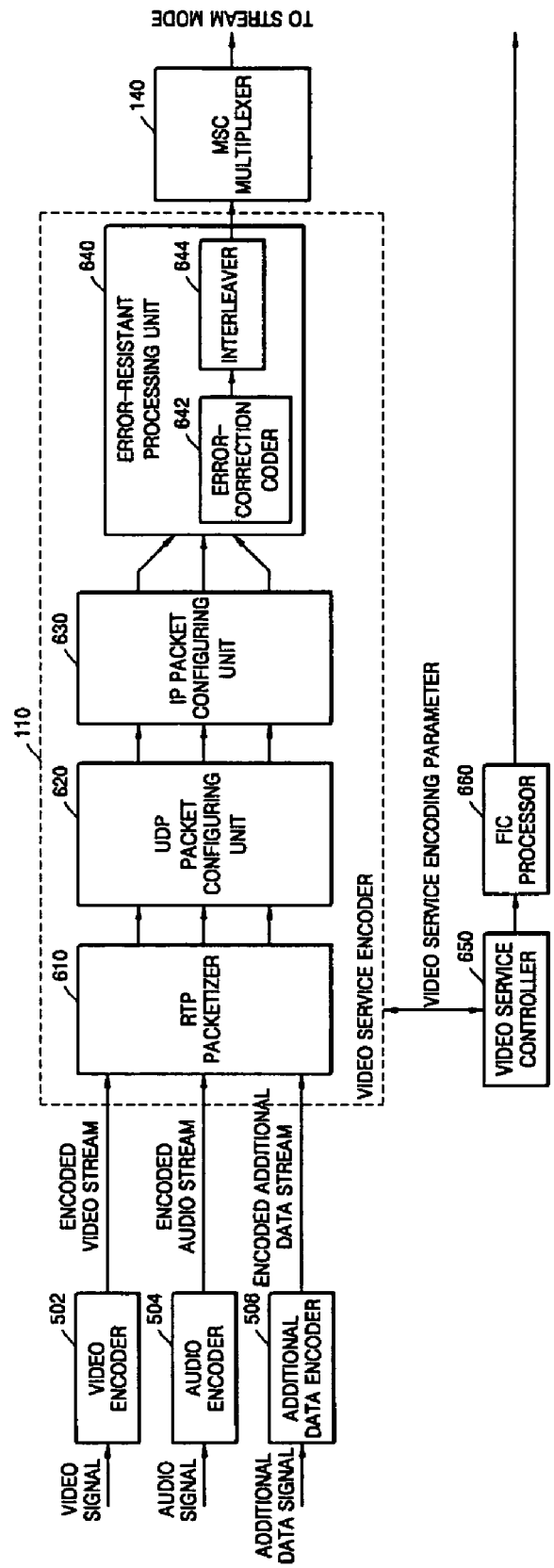
FIG. 6 is a detailed block diagram of a video service encoder for converting video service data into an IP packet to provide a video service.

FIG. 6 is a detailed block diagram of a video service encoder of converting video service data into an IP packet and providing a video service.

A video encoder 502, an audio encoder 504, and an additional data encoder 506 shown in FIG. 6 operate in the same manner as corresponding components shown in FIG. 5.

An RTP packetizer 610 converts an encoded video stream, an encoded audio stream, and an encoded additional data stream, respectively, into RTP packets. The RTP packetizer 610 selects one among various packetization methods and packetizes the streams according to the selected method. If RTP packetization is selected, a payload type value, etc. of an audio RTP packet or a video RTP packet are written in an RTP header and the RTP header is output as a video service encoding parameter. The created RTP packets are transferred to a UDP packet configuring unit 620. The UDP packet configuring unit 620 adds an UDP header to the RTP packet to thus create a UDP packet, and transfers the UDP packet to the IP packet configuring unit 630. The IP packet configuring unit 630 adds an IP header to the UDP packet to thus create an IP packet.

The IP packet is input to the error-resistant processing unit 640 to cope with transmission errors. An IP packet is generally variable in length. Therefore, in order to perform MPEG-2 TS-based error-resistant processing, it is necessary to divide the IP packet into pieces of a constant size, like an MPEG-2 TS packet. For this reason, the IP packet is divided into IP packets with the same size as an MPEG-TS packet. That is, 188 bytes of an IP packet are configured using synchronization data and payload data, or the IP packet is multiplexed according to MPEG-2 TS. Then, the resultant IP packet is transferred to the error-resistant processing unit 640 to add error correction data to the IP packet. Information regarding error-correction and interleaving are output as video service encoding parameters.

The error-resistant processing unit 640 performs error-resistant processing on the received IP packet to create an error-resistant stream and transfers the error resistant stream to the MSC multiplexer 140. The MSC multiplexer 140 transmits the error-resistant stream through the main service channel of the DAB.

The parameterized information, which is a video service encoding parameter, is input to the video service controller 650. The video service controller 650 sends the video service encoding parameter to the FIC processor 660 to transmit the video service encoding parameter through a FIC. The FIC processor 660 codes the video service encoding parameter and transmits the coded video service encoding parameter through the FIC. Encoding information of video signals and audio signals among received encoding parameters is profiled and written to the FIC. The types of the error-correction coding and interleaving used by the error-resistant processing unit 640 are written to the DSCTy field of FIG 0/2. The packetization information used by the RTP packetizer 610 is written to the user application field of FIG 0/13 and transmitted through the FIC.

Figure 7:
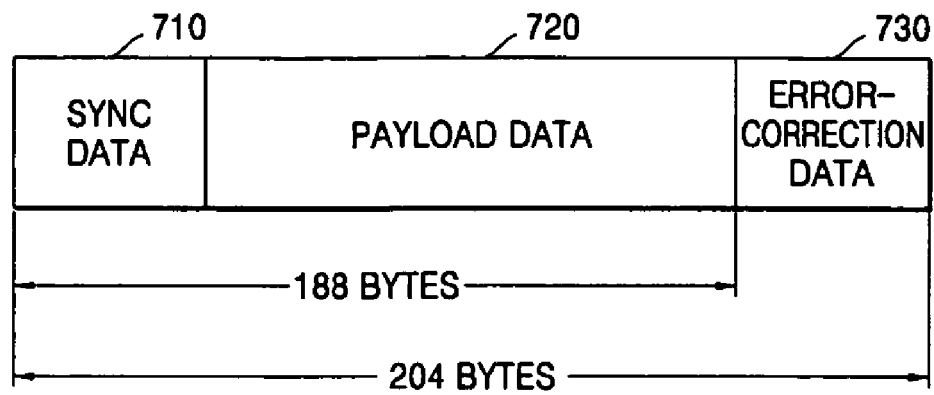
FIG. 7 shows a structure of an MPEG-2 TS packet created by adding synchronization data and error-correction data.

FIG. 7 shows the structure of an MPEG-2 TS packet created by adding synchronization data 710 and error-correction data 730.

Referring to FIG. 7, 188 bytes of a MPEG-2 TS packet are created using the synchronization data 710 and payload data 720, and the error correction data 730 created by error-correction coding such as Reed-Solomon coding is added to the MPEG-2 TS packet.

Figure 8:
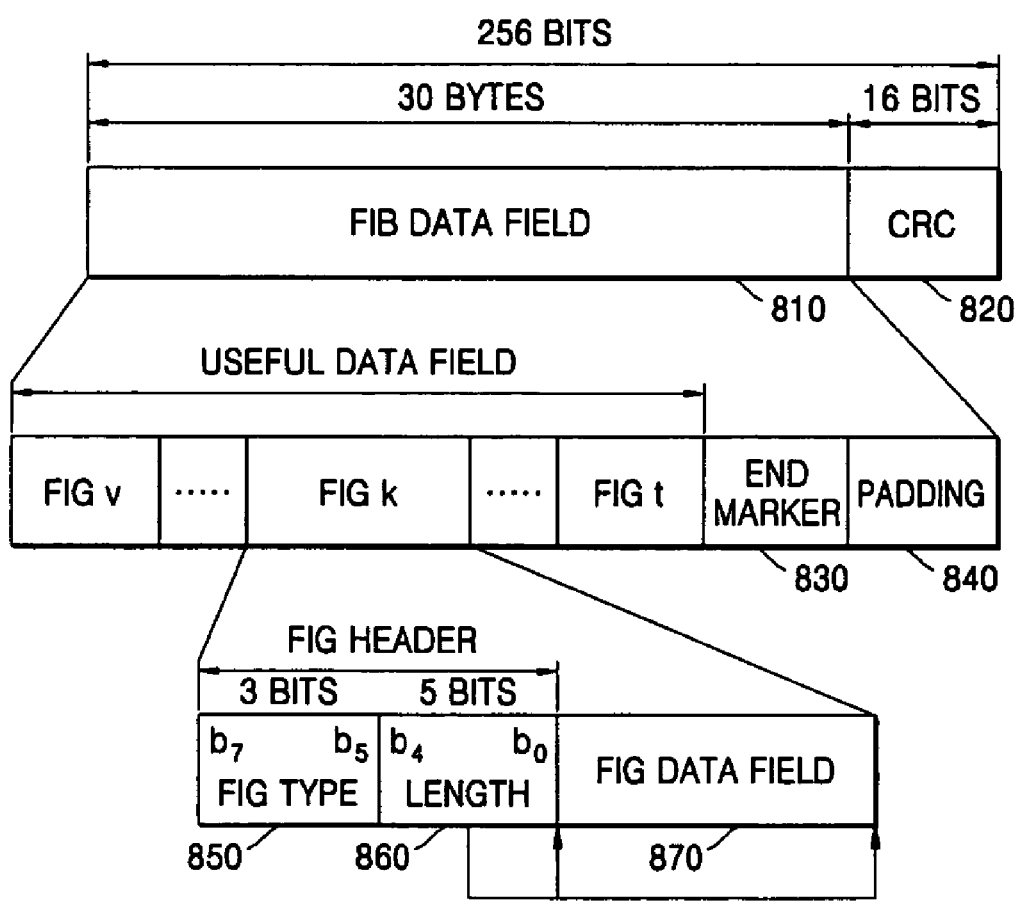
FIG. 8 shows a structure of Fast Information Block (FIB)

FIG. 8 shows the structure of a Fast Information Block (FIB).

A FIC consists of several FIBs, each consisting of a FIB data field 810 and a cycle redundancy check (CRC) field 820. The FIB data field 810 has 30 bytes and includes a plurality of FIGs. If the FIB data field 810 is not completely filled with FIG data, an end marker 830 is inserted into the FIB data field 810 and a null data field 840 is padded, thus creating 256 bits of an FIB, so to inform the DAB receiver that there is no further FIG data. The end marker 830 may be "111 11111". The header of each FIG includes an FIG type field 850 and a length field 860 that indicate the type of data and the length of an FIG data field 870, respectively. Substantial data is contained in the FIG data field 870 following the header. Information regarding the type of FIG or the syntax of data depends on the type of application used or the type of information to be reported.

Now, the formats of FIG types regarding service processing according to an embodiment of the present invention will be described.

Figure 9:
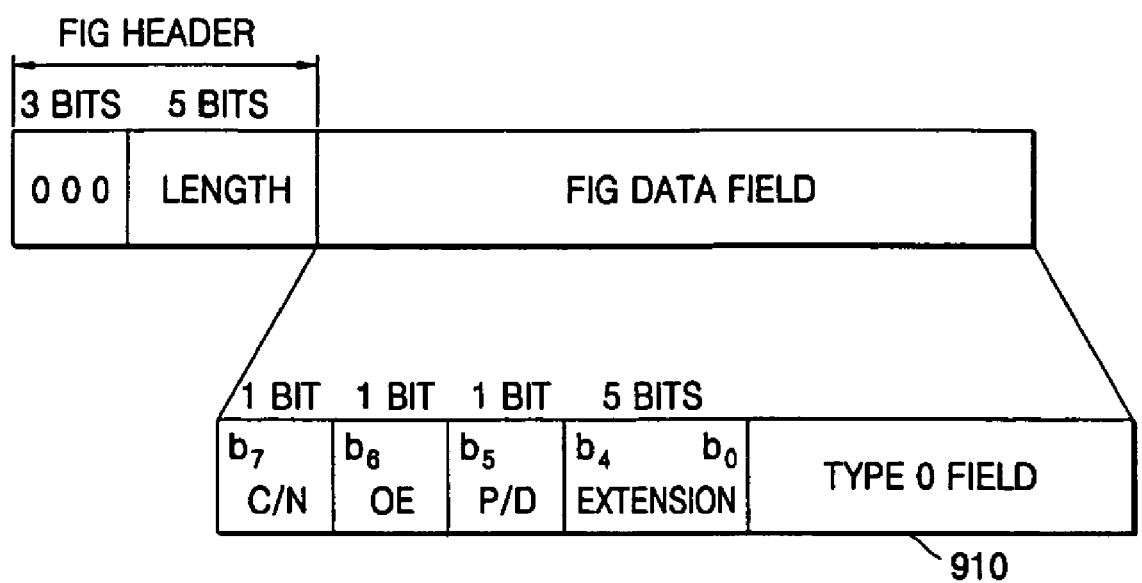
FIG. 9 shows a structure of FIG type 0.

FIG. 9 shows the structure of FIG type 0 910.

The FIG type 0 910 contains information regarding the structures of current and future multiplex configuration, multiplex re-configuration, and time, and other basic service information. The FIG type 0 910 includes various kinds of information according to an extension.

Figure 10:
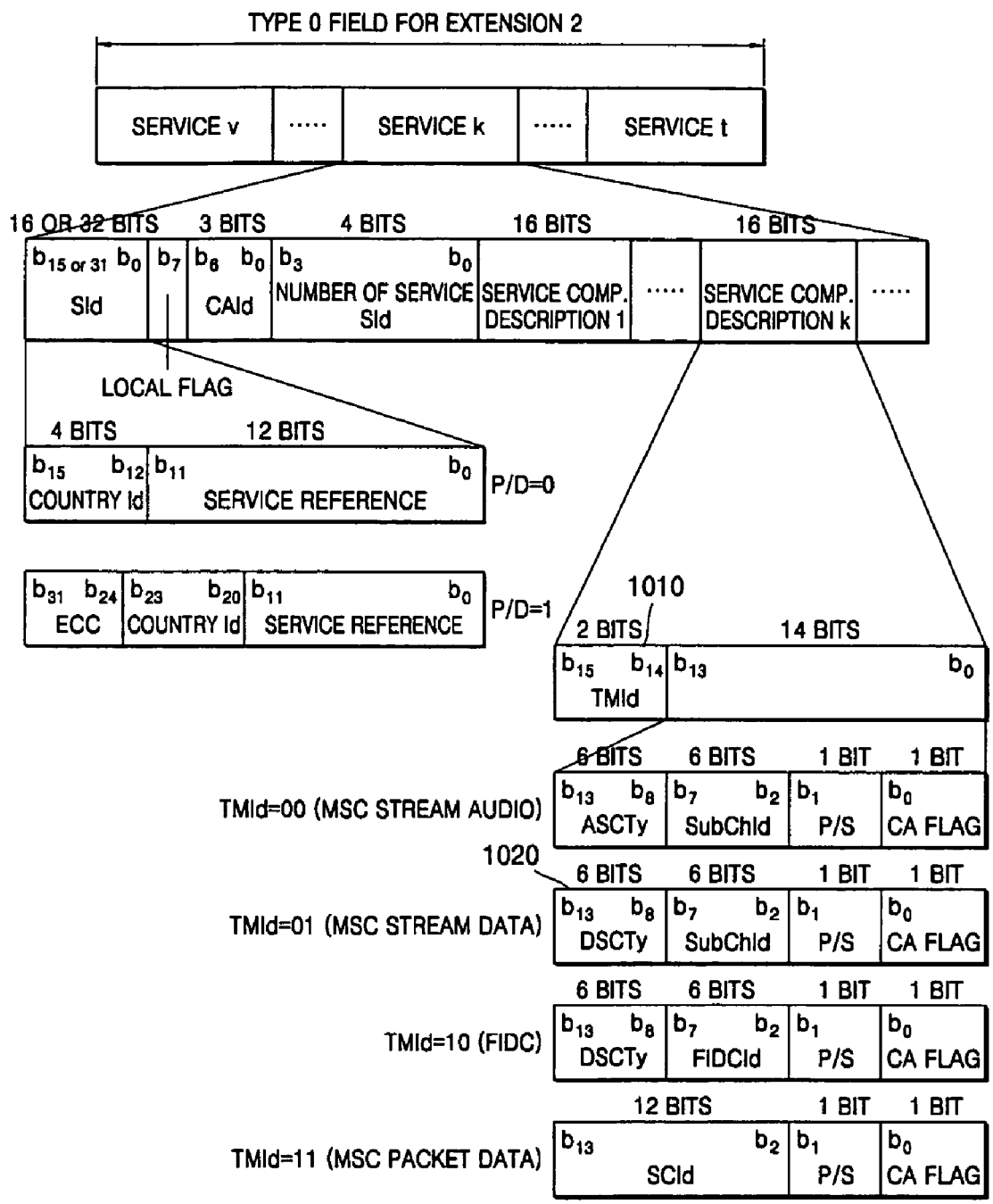
FIG. 10 shows a structure of FIG 0/2.

FIG. 10 shows the structure of FIG 0/2.

FIG 0/2 is FIG type 0 for extension 2. The FIG 0/2 contains information regarding service configuration. Service description is contained in a field k (service k).

If a TMId (Transport Mechanism Identifier) field 1010 is '10', a corresponding service component is a stream mode data service. In a video service using a stream mode, a DSCTy (Data Service Component Type) field 1020 must be newly defined. In the present embodiment, a fact that error-resistant processing is used as a video service component, is written in the DSCTy field 1020. For example, if Reed-Solomon error-correction coding RS(204, 188) and convolutional interleaving (12x17) are used in the stream mode for the video service and Reed-Solomon error-correction coding RS(208, 192) and block interleaving are used in a packet mode for a multimedia service, to allow a receiver to distinguish them, the DSCTy field 1020 stores one of the following values.

DSCTy: value nnnnnn: stream mode for video service (RS (204,188), CI(12x17))

DSCTy: value mmmrnmm: packet mode for multimedia service (RS(208, 192), block interleaving)

Figure 11A:
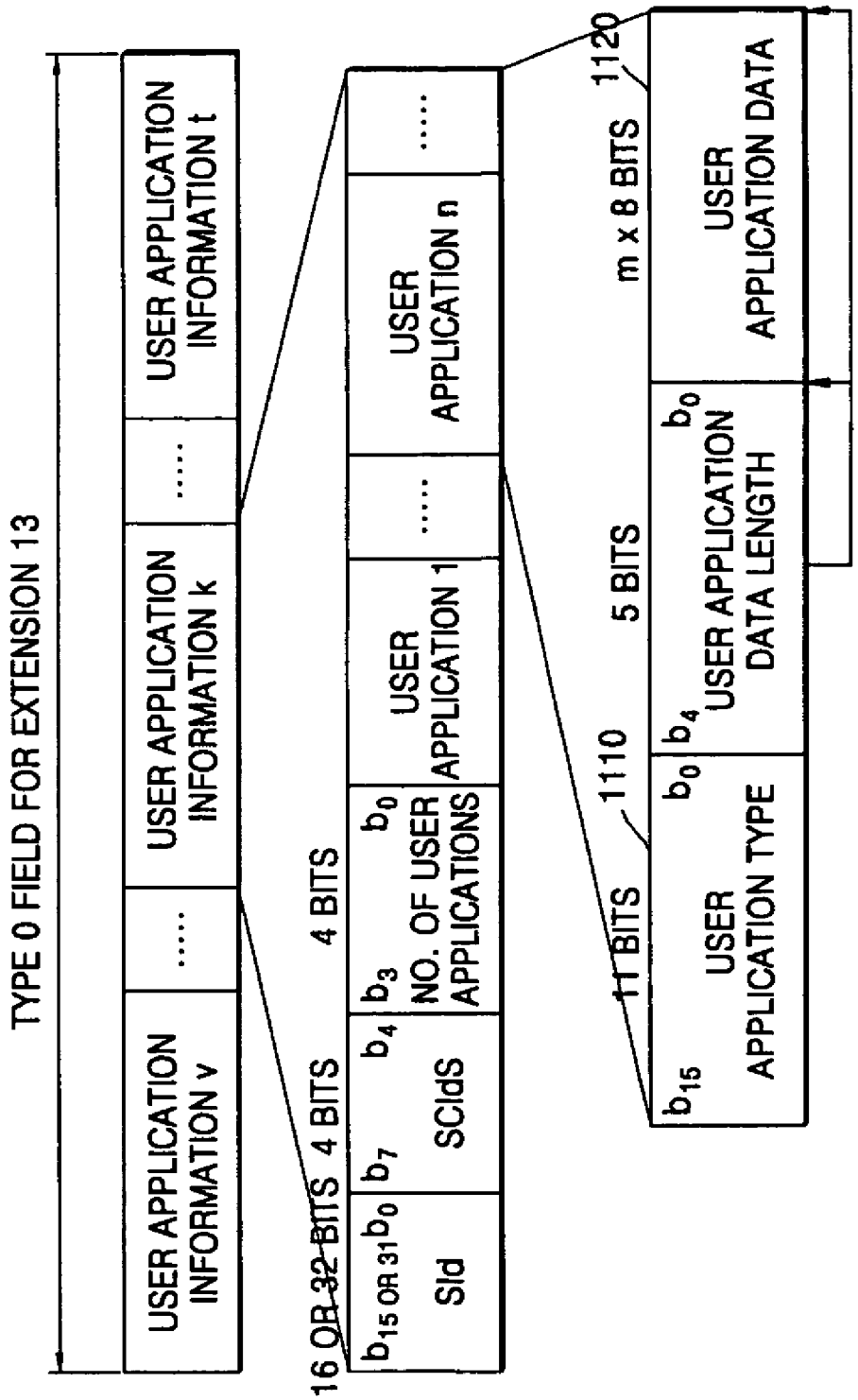
FIG. 11A shows a detailed structure of a user application field of FIG 0/13.

FIG. 11A shows the detailed structure of a user application field of FIG 0/13.

The FIG 0/13 contains data required for a service decoder of a DAB receiver. Referring to FIG. 11A, a User Application Type field 1110 is used to indicate a user application module that will decode data corresponding to a service identifier included in an SId field. In a video service using a stream mode, the User Application Type field 1110 is preferably used to indicate a video service.

A User Application Data field 1120 stores information regarding user program types for packet modes defined in a DAB standard, when packet mode data, such as the type of encoding, the types of packetization and multiplexing, character information, traffic information, still images, and web information, used in a video service, is used as additional data. That is, the User Application Type field 1110 is used to indicate a video service and the User Application Data field 1120 is used to store encoding parameters each with a format shown in FIG. 12.

Meanwhile, it is possible to write-a-video service encoding parameter by newly defining an extension of FIG type 0. In this case, a User Application field as shown in FIG. 11B is created.

FIG. 11B shows the structure of a FIG for a newly-defined video service encoding parameter.

Figure 16:
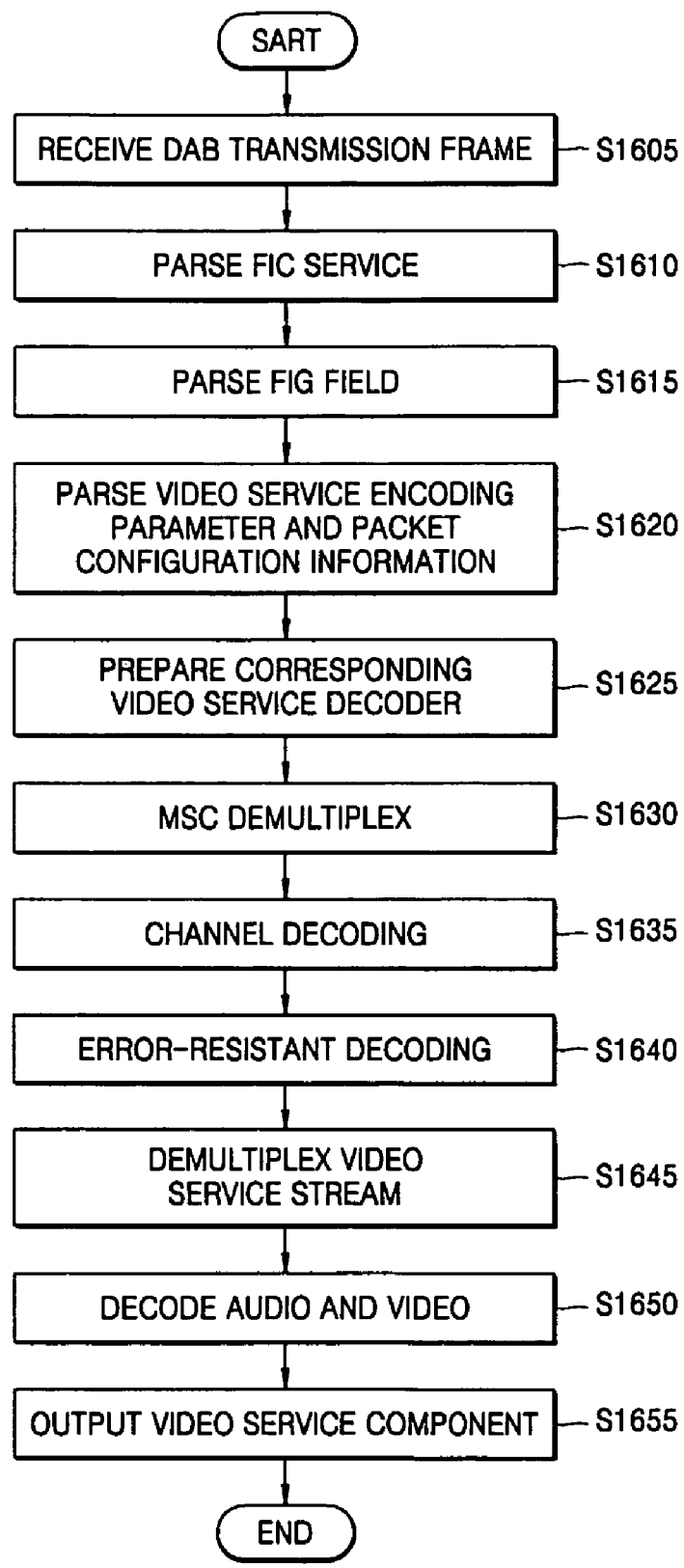
FIG. 16 is a flowchart illustrating a method of receiving a video service with reference to video service encoding information and packet configuration information in the DAB receiving portion, according to an embodiment of the present invention.

Referring to FIG. 11B, 16 bits of a Service Identifier SId are added to the head of the User Application field and an encoding parameter with a format of FIG. 12 is added to the end of the User Application field.

FIG. 12 shows the structure of data including packetization information and an encoding parameter, created by adding profile information and other information.

The encoding parameter and packetization information include a profile ID and packetization information for video and audio data. Hereinafter, the profile ID will be described in detail.

For example, if MPEG-4 AVC-based video coding is used, MPEG-4 BSAC-based audio coding is used, and MPEG-2 TS-based packetization and multiplexing is used according to MPEG-4 SL, a profiled index value 0x00 is written to the profile ID field, without individually writing the types of the video coding, audio coding, and packetization and multiplexing to the User Application data field.

TABLE 1

| Profile ID | Profile description | Video codec | Audio codec | Muxing/packet |
|---|---|---|---|---|
| 0x00 | Video service 1 | MPEG-4 AVC | MPEG-4 BSAC | MPEG-2 TS with MPEG-4 SL |
| 0x01 | Video service 2 | MPEG-4 AVC | MPEG-4 AAC | MPEG-2 TS with MPEG-4 SL |
| 0x02 | Video service 3 | MPEG-4 AVC | MPEG-4 AAC | MPEG-2 TS with MPEG-2 PES |
| 0x03 | Video service 4 | MPEG-4 Part 2 | MPEG-4 AAC | MPEG-2 TS with MPEG-2 PES |

Video service encoding parameter information is contained in FIG 0/8 and FIG 0/13 of a FIC. In a receiver, a video service controller processes a video service using the video encoding parameter information.

Profile information and additional information are separately assigned to different FIGs so that an encoding parameter and packetization-related information can be separately written to two or more different FIGs. Also, the encoding parameter and packetization information can be provided as essential information when an Electronic Program Guide (EPG) is provided in broadcasting. Accordingly, by analyzing the encoding parameter and packetization information of a video service, it is possible to in advance determine whether or not the video service can be processed by the receiver.

Figure 13:
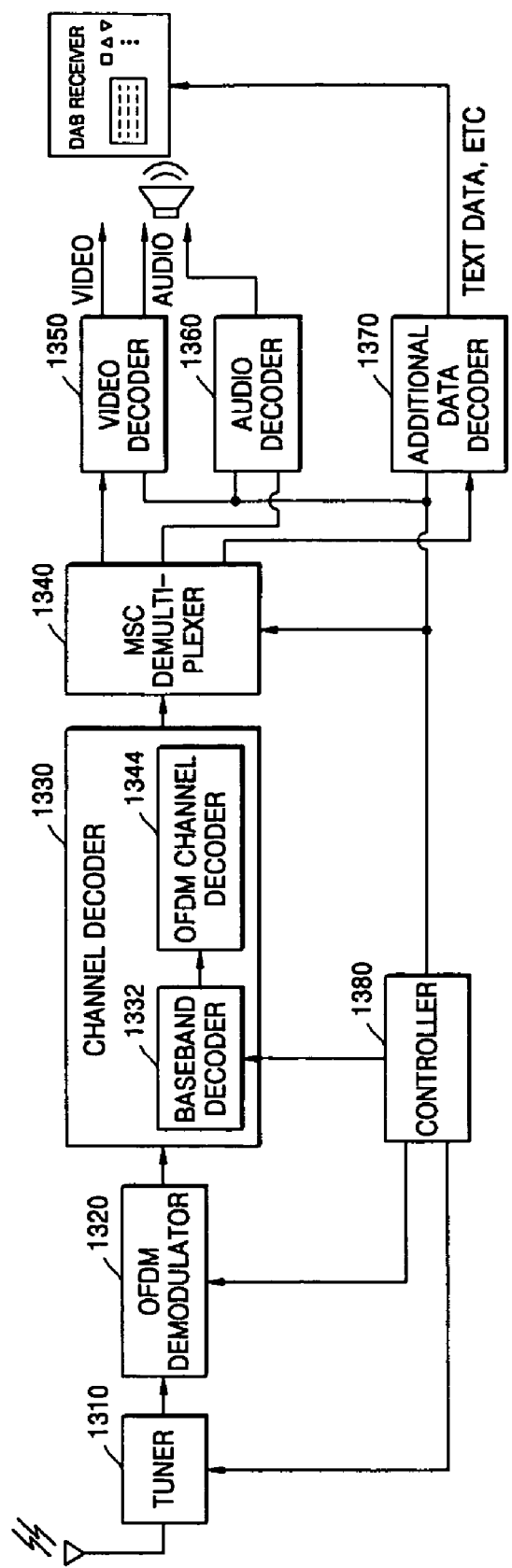
FIG. 13 is a block diagram of a receiving portion of receiving video services in a DAB system.

FIG. 13 is a block diagram of a receiving portion (hereinafter, called 'DAB receiver') of a DAB system receiving a video service.

The DAB receiver receives an OFDM-modulated signal through a tuner 1310. An OFDM demodulator 1320 receives and demodulates the OFDM-modulated signal, thus creating a DAB transmission frame. A channel decoder 1330 includes a baseband decoder 1332 and an OFDM channel decoder

1334. The channel decoder 1330 parses FIC data, creates a service list, and shows the service list to a user. The FIC data contains a video service encoding parameter and packetization information. Therefore, by parsing the FIC data, it is possible to recognize the type of a provided service, and the types of encoding and packetization of data configuring the service. If a user selects a service, an MSC inverse-multiplex unit 1340 extracts and outputs data corresponding to the selected service. If the user selects a video service, an encoded video stream, an encoded audio stream, and an encoded additional data stream configuring the video service are respectively transferred to a video decoder 1350, an audio decoder 1360, and an additional data decoder 1370, and are respectively decoded by the video decoder 1350, the audio decoder 1360, and the additional data decoder 1370. A controller 1380 controls the respective decoders 1350, 1360, and 1370, on the basis of the video service encoding parameter information and packetization information.

Figure 14:
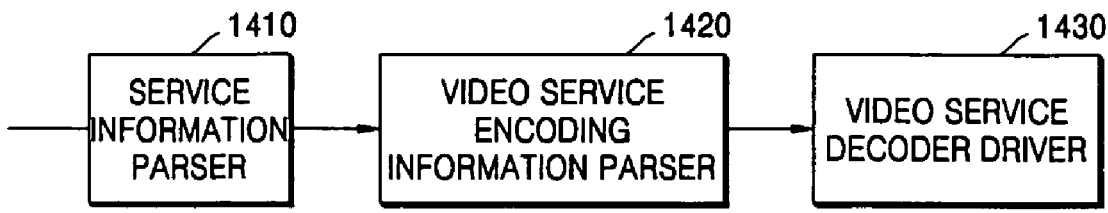
FIG. 14 is a block diagram of a video service controller.

FIG. 14 shows the detailed configuration of the video service controller.

The video service controller includes a service information parser 1410, a video service encoding information parser 1420, and a video service decoder driving unit 1430.

The service information parser 1410 parses FIG 0/2 described above with reference to FIG. 10 and displays a service which is currently provided. If a user selects a video service, the service information parser 1410 parses information regarding a sub channel and a service component related to the selected service.

The video service encoding information parser 1420 parses the type of error-resistant processing of a corresponding video service stored in a DSCTy field of FIG 0/2, and parses the type of video service encoding applied to the video service based on User Application data and a User Application type of FIG 0/13. The video service decoder driving unit 1430 drives a video service decoder including an error-resistant processing unit, on the basis of video service encoding information obtained through the parsed result.

Figure 15A:
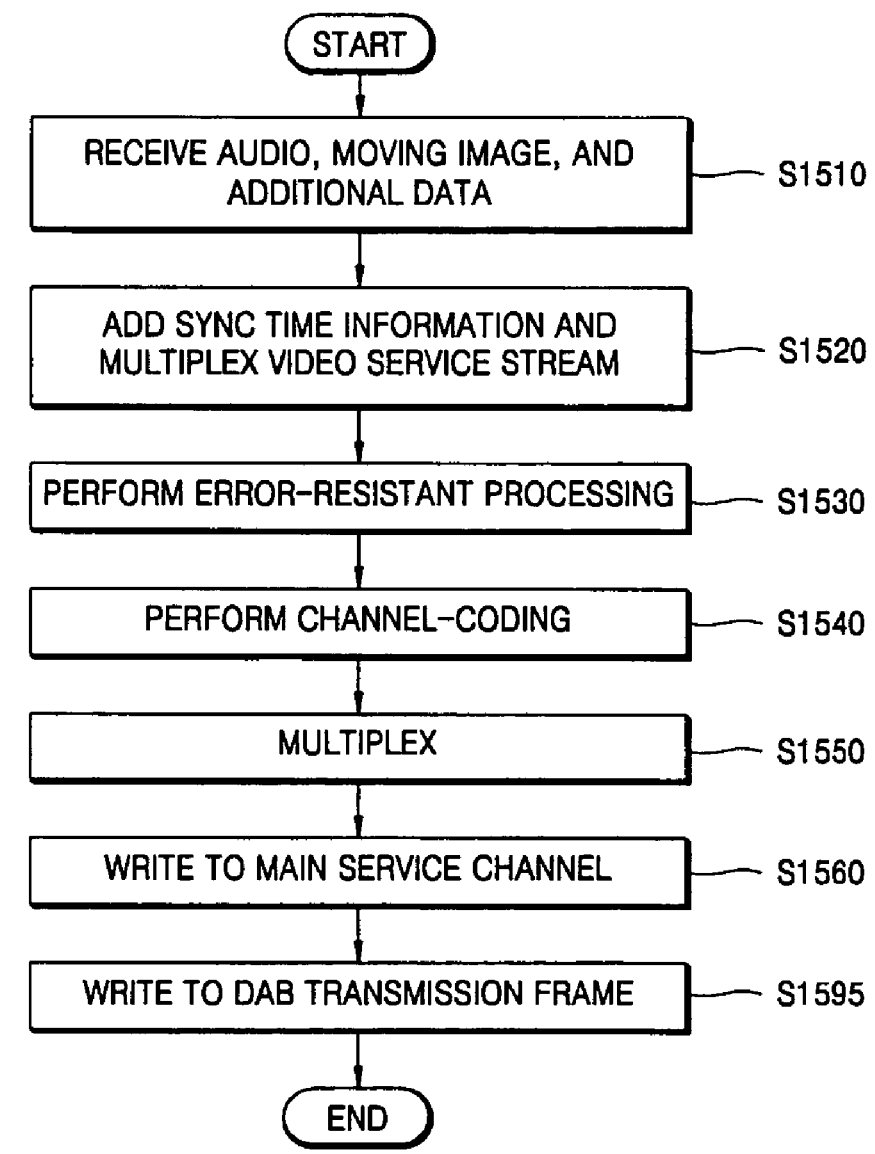
FIGS. 15A and 15B are flowcharts illustrating a method of transmitting a video service with reference to video service encoding information and packet configuration information through a stream mode in DAB, according to an embodiment of the present invention.
Figure 15B:
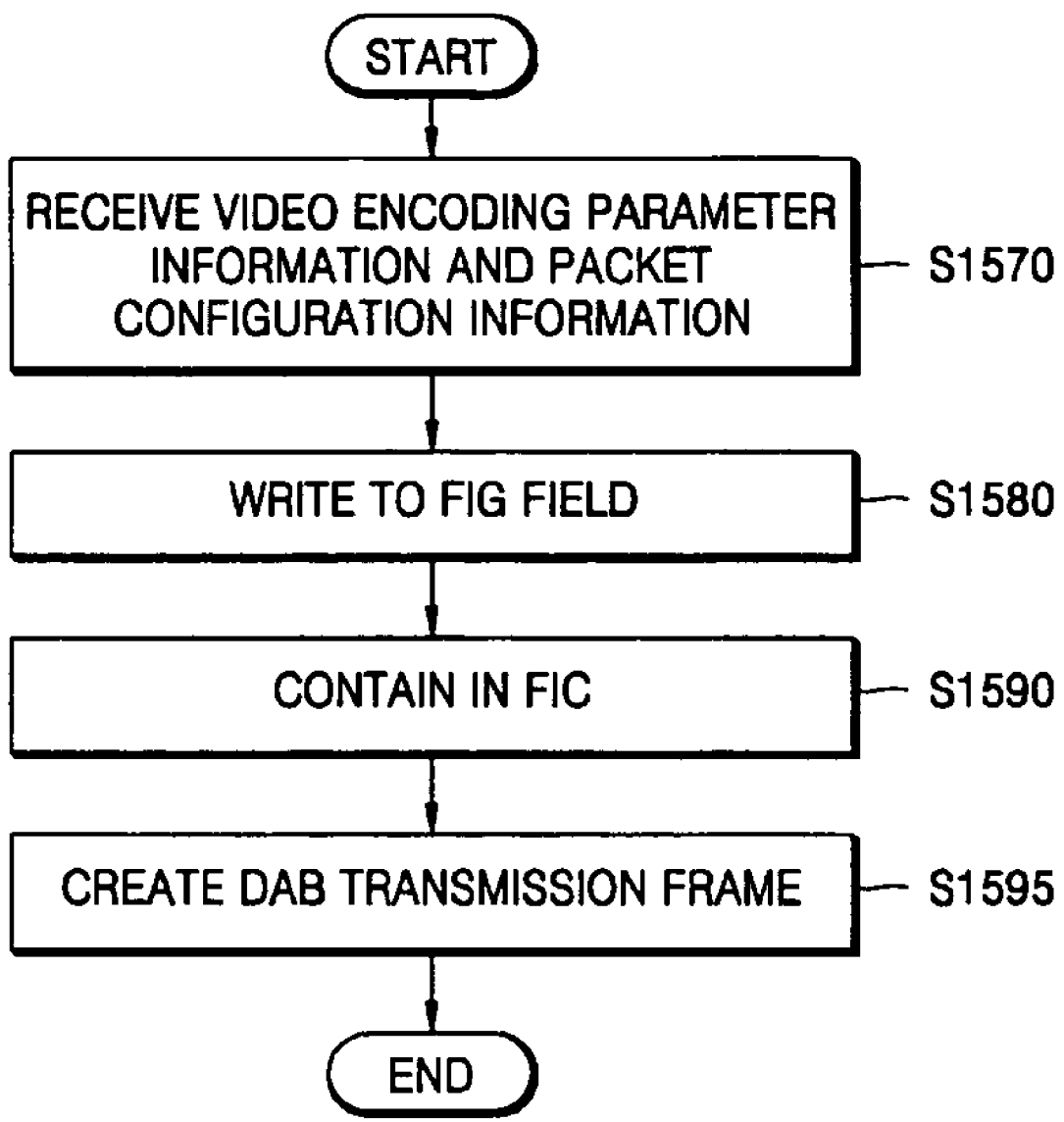

FIGS. 15A and 15B are flowcharts illustrating a method of transmitting a video service with reference to video service encoding information and packet configuration information in a stream mode of DAB, according to an embodiment of the present invention.

Referring to FIGS. 15A and 15B, encoded audio data, a moving image, additional data, etc., related to a video service, are received from the outside, or audio and video data encoded by an audio encoder and a video encoder included in a video service encoder are received (operation S1510). To stably perform the video service, synchronization time information is added to the received data to thus create a video service stream and multiplexing of the video service stream is performed (operation S1520). Then, error-correction data is added and convolutional interleaving is performed by the error-resistant processing unit (operation S1530) to thus create an error-resistant stream. The created error-resistant stream is channel-coded (operation S1540) and multiplexed (operation S1550). The channel-coded and multiplexed stream is written to a main service channel (operation S1560). The channel-coded and multiplexed stream is written to a DAB transmission frame with a FIC including a video service encoding parameter, and the DAB transmission frame is transmitted (operation S1595).

Meanwhile, related video service encoding parameter information and packet configuration information are received (operation S1570), written to a corresponding FIG field (operation S1580), and then contained in the FIC (operation S1590). That is, information for allowing the receiver to stably process a provided video service, is contained in a different FIC from a main service channel MSC as a service data channel. The FIC consists of FIBs each including several FIGs. In the present embodiment, a field in FIG 0/8 and FIG 0/13 is corrected or newly defined and video service encoding parameter information and packet configuration information are stored in the field. The video service encoding parameter information is multiplexed together with the main service channel MSC to create a DAB transmission frame (operation S1595). The configurations of the FIG 0/8 and FIG 0/13 have been described above.

FIG. 16 is a flowchart illustrating a method of receiving a video service with reference to video service encoding information and packet configuration information in the DAB receiver, according to an embodiment of the present invention.

Referring to FIG. 16, a DAB transmission frame is received (operation S1605), and information regarding a sub channel and a service component related to a service selected by a user is parsed (operation S1610). Then, FIG 0/8 and FIG 0/13 in a FIC, which are different channels from a service data channel, are parsed (operation S1615). Accordingly, video service encoding parameter information and packet configuration information required for processing the selected video service are recognized (operation S1620). Thus, preparation for driving a corresponding video service decoder on the basis of the parsed information is complete (operation S1625).

Then, the received DAB transmission frame is inverse-multiplexed (operation S1630). Next, data of a corresponding sub channel of a corresponding main service channel is channel-decoded (operation S1635) and subjected to error-resistant decoding (operation S1640), thus creating a video stream. Then, the video service stream is inverse-multiplexed (operation S1645) and de-packetized to thus extract time synchronization information. Audio and video data are decoded by the audio and video decoder (operation S1650) and the decoded results are output as video service components according to the extracted time synchronization information (operation S1655).

Additional data consisting of packet mode data, such as character information, traffic information, still images, and web information, is also decoded or de-packetized by a corresponding additional data decoder initialized according to the video service encoding parameter information and the packetization information, etc., and then output.

The method for controlling a video service including a video service encoding parameter and packetization information, according to the present invention, can be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed over network coupled computer systems so that the computer readable code is stored and executed in a distributed fashion.

As described above, according to the present invention, by efficiently processing a video service using a stream mode of DAB, different types of DAB receivers can uniformly and easily implement video services. Also, since information related to video service encoding parameters is in advance received using FIC information, it is possible to in advance recognize the type of decoding without decoding data of a main service, which facilitates controlling of a decoder included in a receiver.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for providing a video service in digital audio broadcasting (DAB) by a digital audio broadcasting (DAB) transmitter, comprising:
   storing by the DAB transmitter, information indicating a provided service mode in a fast information channel (FIC) of a DAB transmission frame, wherein the provided service mode is one of a stream mode and a packet mode; and
   storing by the DAB transmitter, a video service stream encoded according to the provided service mode, in a service data channel of the DAB transmission frame, the service data channel being different from the FIC,
   wherein at least one of types of an error correction encoding method and an interleaving method of the video service stream is decided according to the provided service mode.

2. The method of claim 1, wherein the video service stream comprises at least one of an audio data stream and a video data stream.

3. The method of claim 1, wherein if the provided service mode is the stream mode, encoding of the video service stream comprises error-correction coding and interleaving, wherein the error-correction coding is performed using a Reed-Solomon coding method and the interleaving is performed using a Convolutional Interleaving method.

4. The method of claim 1, if the provided service mode is the packet mode, further comprising storing information indicating that a predetermined error-correction method is applied to an encoding of the video service stream, in the FIC.

5. The method of claim 1, wherein if the provided service mode is the packet mode, encoding of the video service stream comprises error-correction coding and interleaving, wherein the error-correction coding is performed using a Reed-Solomon coding method and the interleaving is performed using a Block Interleaving method.

6. The method of claim 1, wherein the FIC comprises Fast Information Blocks (FIBs) each having a predetermined size, a data field of each FIB comprising at least one Fast Information Group (FIG), and
   the FIG comprises a data service component type field to which a type of error-resistant processing applied to the video service stream is written.

7. The method of claim 6, wherein the FIG comprises a user application type field for designating a video service and a profile index field for parsing a type of a decoder to process an audio stream or a video stream included in the video service stream.

8. The method of claim 6, wherein a Fast Information Group (FIG) comprises a user application type field for designating a video service and a decoder type field for designating a type of a decoder to process an audio data stream and a video data stream included in the video service stream.

9. A method for receiving a video service in digital audio broadcasting (DAB) by digital audio broadcasting (DAB) receiver, comprising:
   receiving by a parser unit, DAB transmission frame, and parsing a provided video service mode from data included in a fast information channel (FIC) in the DAB transmission frame, wherein the service mode is one of a stream mode and a packet mode; and
   configuring by a video service decoder driver, the DAB transmission frame according to a result of the parsing, and decoding an encoded video service stream stored in a service data channel of the DAB transmission frame, the service data channel being different from the FIC,
   wherein at least one of types of an error correction encoding method and an interleaving method of the video service stream is decided according to the provided service mode.

10. The method of claim 9, wherein the video service stream comprises at least one of an audio data stream and a video data stream.

11. The method of claim 9, wherein if the provided service mode is the stream mode, decoding of the encoded video service stream comprises error-correction decoding and interleaving, wherein the error-correction decoding is performed using a Reed-Solomon decoding method and the interleaving is performed using a Convolutional Interleaving method.

12. The method of claim 9, if the provided service mode is the packet mode, further comprising parsing information indicating that a predetermined error-correction method is applied to the encoded video service stream stored in the FIC.

13. The method of claim 9, wherein if the provided service mode is the packet mode, decoding of the encoded video service stream comprises error-correction decoding and interleaving, wherein the error-correction decoding is performed using a Reed-Solomon coding method and the interleaving is performed using a Block Interleaving method.

14. The method of claim 9, wherein the FIC comprises Fast Information Blocks (FIBs) each having a predetermined size and a data field of each FIB comprises at least one Fast Information Group (FIG), and
   the FIG comprises a data service component type field to which a type of error-resistant processing applied to the video service is written.

15. The method of claim 14, wherein the FIG comprises a user application type field for designating a video service and a profile index field for parsing a type of a decoder to process an audio stream or a video stream included in the video service.

16. The method of claim 13, wherein a Fast Information Group (FIG) comprises a user application type field for designating a video service and a decoder type field for designating a type of a decoder to process an audio stream and a video stream included in the video service.

17. An apparatus for processing a video service, comprising:
   a service mode parser which receives a digital audio broadcasting (DAB) transmission frame, and parsing a provided service mode from information stored in a fast information channel (FIC) of the DAB transmission frame, wherein the service mode is one of a stream mode and a packet mode; and
   a video service decoder driver which configures the DAB transmission frame according to the provided service mode, and drives a decoder which decodes a video service stream stored in a service data channel which is different from the FIC,
   wherein at least one of types of an error correction encoding method and an interleaving method of the video service stream is decided according to the provided service mode.

18. The apparatus of claim 17, wherein if the provided service mode is the stream mode, decoding of the video service stream comprises error-correction decoding and interleaving, wherein the error-correction decoding is performed using a Reed-Solomon coding method and the interleaving is performed using a Convolutional Interleaving method.

19. The apparatus of claim 17, wherein if the provided service mode is the packet mode, decoding of the video service stream comprises error-correction coding and interleaving, wherein the error-correction decoding is performed using a Reed-Solomon coding method and the interleaving is performed using a Block Interleaving method.

20. A method of providing a transmission data frame for a video service in digital audio broadcasting (DAB) by a digital audio broadcasting (DAB) transmitter, the method comprising:
  configuring by the DAB transmitter, a fast information channel (FIC) component storing information indicating a provided service mode which is one of a stream mode and a packet mode;
  configuring by the DAB transmitter, a service data channel component storing a video service stream encoded according to the provided service mode; and
  multiplexing the fast information channel (FIC) component and the service data channel component to produce a DAB transmission frame comprising a fast information channel (FIC) storing the information and a service data channel storing the video service stream, the service data channel being different from the FIC,
  wherein at least one of types of an error correction encoding method and an interleaving method of the video service stream is decided according to the provided service mode.

21. The method of claim 20, wherein the video service stream comprises at least one of an audio data stream and a video data stream.

22. The method of claim 20, wherein if the provided service mode is the stream mode, decoding of the video service stream comprises error-correction decoding and interleaving, wherein the error-correction decoding is performed using a Reed-Solomon coding method and the interleaving is performed using a Convolutional Interleaving method.

23. The method of claim 20, wherein if the provided service mode is the packet mode, the FIC comprises information indicating that a predetermined error-correction method is applied to a decoding of the video service stream.

24. The method of claim 20, wherein if the provided service mode is the packet mode, encoding of the video service stream comprises error-correction coding and interleaving, wherein the error-correction coding is performed using a Reed-Solomon coding method and the interleaving is performed using a Block Interleaving method.

25. The method of claim 20, wherein the FIC comprises Fast Information Blocks (FIBs) each having a predetermined size, a data field of each FIB comprises at least one Fast Information Group (FIG), and
  the FIG comprises a data service component type field to which a type of error-resistant processing applied to the video service stream is written.

26. The method of claim 25, wherein the FIG comprises a user application type field for designating a video service and a profile index field for parsing a type of a decoder to process an audio data stream or a video data stream included in the video service stream.

27. The method of claim 24, wherein a Fast Information Group (FIG) comprises a user application type field for designating a video service and a decoder type field for designating a type of a decoder to process an audio stream and a video stream included in the video service stream.

28. A computer-readable, not including carrier waves, the medium encoded with computer executable instructions for executing the method of claim 1.

29. A computer-readable, not including carrier waves, the medium encoded with computer executable instructions for executing the method of claim 9.

30. A method for providing a video service in digital audio broadcasting (DAB) by a digital audio broadcasting (DAB) transmitter, comprising:
  storing by the DAB transmitter, information indicating a provided service mode in a fast information channel (FIC) of a DAB transmission frame, wherein the provided service mode is one of a stream mode and a packet mode; and
  storing by the DAB transmitter, a video service stream encoded according to the provided service mode, in a service data channel of the DAB transmission frame, the service data channel being different from the FIC,
  wherein the DAB transmission frame comprises a synchronization channel which includes a null symbol indicating a transmission mode.

31. A method for receiving a video service in digital audio broadcasting (DAB) by digital audio broadcasting (DAB) receiver, comprising:
  receiving by a parser unit, DAB transmission frame, and parsing a provided video service mode from data included in a fast information channel (FIC) in the DAB transmission frame, wherein the service mode is one of a stream mode and a packet mode; and
  configuring by a video service decoder driver, the DAB transmission frame according to a result of the parsing, and decoding an encoded video service stream stored in a service data channel of the DAB transmission frame, the service data channel being different from the FIC,
  wherein the DAB transmission frame comprises a synchronization channel which includes a null symbol indicating a transmission mode.

32. An apparatus for processing a video service, comprising:
  a service mode parser which receives a digital audio broadcasting (DAB) transmission frame, and parsing a provided service mode from information stored in a fast information channel (FIC) of the DAB transmission frame, wherein the service mode is one of a stream mode and a packet mode; and
  a video service decoder driver which configures the DAB transmission frame according to the provided service mode, and drives a decoder which decodes a video service stream stored in a service data channel which is different from the FIC,
  wherein the DAB transmission frame comprises a synchronization channel which includes a null symbol indicating a transmission mode.

33. A method of providing a transmission data frame for a video service in digital audio broadcasting (DAB) by a digital audio broadcasting (DAB) transmitter, the method comprising:
  configuring by the DAB transmitter, a fast information channel (FIC) component storing information indicating a provided service mode which is one of a stream mode and a packet
  configuring by the DAB transmitter, a service data channel component storing a video service stream encoded according to the provided service mode; and multiplexing the fast information channel (FIC) component and the service data channel component to produce a DAB transmission frame comprising a fast information channel (FTC) storing the information and a service data, wherein the DAB transmission frame comprises a synchronization channel which includes a null symbol indicating a transmission mode.

* * * * *